(12) United States Patent
Mayer Pujadas

(10) Patent No.: US 9,114,760 B2
(45) Date of Patent: Aug. 25, 2015

(54) DECORATIVE RADOME FOR AUTOMOTIVE VEHICULAR APPLICATIONS

(75) Inventor: Augusto Mayer Pujadas, Sant cugat del Valles (ES)

(73) Assignee: ZANINI AUTO GRUP, SA, Barcelona (ES)

( * ) Notice: Subject to any disclaimer, the term of this patent is extended or adjusted under 35 U.S.C. 154(b) by 146 days.

(21) Appl. No.: 13/292,708

(22) Filed: Nov. 9, 2011

(65) Prior Publication Data

US 2012/0119961 A1    May 17, 2012

Related U.S. Application Data

(60) Provisional application No. 61/413,551, filed on Nov. 15, 2010.

(51) Int. Cl.
| | |
|---|---|
| *H01Q 1/32* | (2006.01) |
| *H01Q 1/42* | (2006.01) |
| *C23C 4/08* | (2006.01) |
| *B60R 13/00* | (2006.01) |
| *H01Q 1/38* | (2006.01) |
| *H01Q 1/44* | (2006.01) |

(52) U.S. Cl.
CPC .......... *B60R 13/005* (2013.01); *H01Q 1/3233* (2013.01); *H01Q 1/3283* (2013.01); *H01Q 1/38* (2013.01); *H01Q 1/44* (2013.01)

(58) Field of Classification Search
CPC ............... H01Q 1/32; H01Q 1/42; C23C 4/08
USPC .................................. 343/713, 872; 427/455
See application file for complete search history.

(56) References Cited

U.S. PATENT DOCUMENTS

| | | | | |
|---|---|---|---|---|
| 5,971,552 | A * | 10/1999 | O'Farrell et al. | 359/871 |
| 6,328,358 | B1 | 12/2001 | Berweiler | |
| 7,348,932 | B1 * | 3/2008 | Puzella et al. | 343/853 |
| 2004/0210289 | A1 * | 10/2004 | Wang et al. | 607/116 |
| 2005/0031897 | A1 * | 2/2005 | Kamiya et al. | 428/689 |
| 2008/0212189 | A1 * | 9/2008 | Baur et al. | 359/604 |
| 2011/0273356 | A1 * | 11/2011 | Kawaguchi et al. | 343/873 |

FOREIGN PATENT DOCUMENTS

| | | |
|---|---|---|
| EP | 0954052 B1 | 4/1999 |
| EP | 1560288 | 8/2005 |

(Continued)

OTHER PUBLICATIONS

Anonymous, "Metalloid" http://en.wikipedia.org/wiki/Metalloid Nov. 3, 2010.

(Continued)

*Primary Examiner* — Dameon E Levi
*Assistant Examiner* — Andrea Lindgren Baltzell
(74) *Attorney, Agent, or Firm* — Seth Natter; Natter & Natter

(57) ABSTRACT

A molded radome for the beam path of a radar device with low radio transmission loss and improved resistance to attack by the environmental elements comprises a base layer or body composed of a resin and a decoration layer bearing an image. The decoration layer is characterized with bright metallic looking coat disposed on the surface of the base layer or body. The decoration layer is composed of a metalloid such as germanium or a germanium alloy applied to the base layer by sputtering deposition.

22 Claims, 3 Drawing Sheets

(56) References Cited

FOREIGN PATENT DOCUMENTS

| | | |
|---|---|---|
| EP | 1560289 A2 | 8/2005 |
| EP | 2383364 A1 | 11/2011 |
| JP | 2000344032 | 12/2000 |
| JP | 2003252137 | 9/2003 |
| JP | 200990639 | 4/2009 |
| JP | 2010188987 | 9/2010 |
| WO | 2010/084733 A1 | 7/2010 |
| WO | WO2010084733 * 7/2010 ............... H01Q 1/40 |

OTHER PUBLICATIONS

International Search Report Mar. 22, 2012 PCT/IB2011/002859.

\* cited by examiner

DECORATIVE RADOME FOR AUTOMOTIVE VEHICULAR APPLICATIONS

RELATED APPLICATION

The present application claims the priority benefit of U.S. Provisional Application No. 61/413,551, filed Nov. 15, 2010, the contents of which are incorporated herein by reference in its entirety.

BACKGROUND OF THE INVENTION

1. Field of the Invention

The invention relates to a radome or cover for protecting a radar device while presenting a decorative metallic image, especially for radar devices disposed behind the front grill of an automobile.

2. Antecedents of the Invention

In general, radio transmitter-receiver devices, such as a millimeter-wave radar, have been employed as sensors for vehicular collision avoidance and adaptive cruise control systems.

In a radar system or the like that measures obstacles in front of an automobile and the distance between automobiles, the antenna was preferably positioned in the center at the front of the vehicle to obtain maximum performance. Although the radar antenna could be installed near the front grill of automobile, it was preferable to conceal the antenna from view due to its non-aesthetic appearance and to shield the antenna from external environmental factors such as weather and airborne contaminants.

In order protect the antenna and avoid radio interference and signal losses of the radar device, it has been proposed to provide a radar window capable of transmitting radio waves in the front grill corresponding where the radar antenna was located. This allowed radio waves to pass in and out through the window. However, the radar window diminished the appearance of the front grill due to the interruption of the pattern of the grill structural elements. Further, unsightly internal portions of the vehicle, like the radar transmitter-receiver, could be seen through the radar window.

In U.S. Pat. No. 6,328,358 unity between the radar window and the front grill body was provided. The radar window as disclosed in U.S. Pat. No. 6,328,358 was formed by laminating a plurality of resin layers formed with concavity and convexity. This component provided an impression by a metal layer deposited with concavity and convexity between the resin layers such that the fin member of the front grill appeared to extend across the radar window without interruption.

Indium was used as a metal deposited in such radar window. When depositing indium on a deposit member, indium was not deposited on the surface in a uniform film manner, but deposited in a nanometric insular manner. In other words, when indium was deposited on the deposit member, the surface of the deposit member comprised a nanometric combination of a deposit portion where indium was deposited in an insular manner and a non deposit portion where nothing was deposited.

In this case, radio waves could pass in and out through the non-deposit portion and the surface of the deposit member could be recognized upon viewing as a member that had metallic luster, since the deposit portion had indium deposited in a nanometric insular manner.

This selective way of deposition complicated the process of application of the indium metals. Further radio waves did not pass in and out satisfactorily when the deposit portions were formed extremely close together. The conductivity of the metals required the use of low density evaporation methods such thermal evaporation. These methods did not guarantee a uniform deposition in thickness throughout the member or between members produced in the same batch. Other methods of deposition would guarantee uniform insular deposition such sputtering, but sputtering provided a metal density that generates a high level of attenuation, making the system useless for a radome application in front of a radar antenna.

U.S. Pat. No. 6,328,358 disclosed a thin metallic layer comprising indium deposited on a metal portion area that could be viewed from the outside at a plastic-plated member for the beam path of a radar device. However, it was necessary to ensure a bright design and the reliability of durability for radio transmittance by forming a stable protective layer so as not to allow the indium bright film layer to undergo exfoliation or be damaged by an external force, or to be corroded by an external environmental stress such as water or polluted air.

This was due to the following: indium is a very soft metallic material with a value of 1.2 in the Mohs hardness scale; indium corrodes under the aforementioned environmental stress since it is basically a metallic material; it is necessary to ensure the reliability of durability by securing the film thickness with certainty such that the bright-effect design of indium can be obtained without thickening the indium film layer more than is necessary, since a radio transmission loss occurs as a conductivity loss based on the fact that indium is basically a metallic material; and the indium layer melts due to the heat of molten resin when successively conducting secondary formation of the lining resin on a resin-molded component in which a film is formed on the surface of a base body in advance, since the melting point of indium is 156° C., which is extremely low, for example.

Although indium film is suitable for a film of an emblem or the like as it shows a metallic color, it poses problems in that it readily experiences exfoliation and lacks durability and abrasion resistance. Also, indium film may corrode, since it is basically a metal. Thus, when a ceramic film comprising silicon dioxide is disposed, the durability is improved and the film, or paint, can be protected. However, the ceramic film comprising silicon dioxide is colorless, so that the appearance of a metallic color, for example, cannot be provided.

SUMMARY OF THE INVENTION

A molded radome for the beam path of a radar device with low radio transmission loss and improved resistance to attack by the environmental elements comprises a base layer or body composed of a resin and a decoration layer bearing an image. The decoration layer is characterized with bright metallic looking coat disposed on the surface of the base layer or body. The decoration layer is composed of a metalloid such as germanium or a germanium alloy.

From the foregoing compendium, it will be appreciated that it is an aspect of the present invention to provide a decorative radome for automotive vehicular applications of the general character described which is not subject to the disadvantages of the antecedents of the invention aforementioned.

It is a feature of the present invention to provide a decorative radome for automotive vehicular applications of the general character described that offers stable effects as a product over a long period of time, which includes a molded component providing a low level of radio transmission loss and distortion for the beam path of a radar device.

It is a consideration of the present invention to provide a decorative radome for automotive vehicular applications of the general character described that shows a metallic bright color for the beam path of a radar device.

Another consideration of the present invention is to provide a decorative radome for automotive vehicular applications of the general character described which is relatively low in cost.

A still further aspect of the present invention is decorative radome for automotive vehicular applications of the general character described having relatively high durability.

Another aspect of the present invention is to provide a decorative radome for automotive vehicular applications of the general character described having a bright decoration layer with a metallic appearance with low radio transmission loss and improved resistance to wear and/or corrosion.

Further aspects, features and considerations of the present invention in part will be obvious and in part will be pointed out hereinafter.

With these ends in view, the invention finds embodiment in the various combinations of elements, arrangements of parts and series of steps by which the aforesaid aspects, features and considerations and certain other aspects, features and considerations are attained, all with reference to the accompanying drawings and the scope of which will be more particularly pointed out and indicated in the appended claims.

DESCRIPTION OF THE PREFERRED EMBODIMENT

Radomes cover microwave antennas to protect the antennas from rain, ice, wind and other environmental conditions and are also provided to conceal the antennas form view. A principal requirement is that the radome be transparent to radar or radio waves or provide but minimal signal attenuation.

The present invention relates to the use of a metalloid or metalloid alloy for a radome decoration layer. The present invention employs, for example, as a radome decoration layer, germanium, a metalloid of high electric resistivity, i.e. ohm 1 per meter [m] at 20° C.

Due to the high melting point of germanium 938.25° C. and its boiling point 2833° C., this element cannot be deposited using thermal evaporation methods like the ones applied in the case of indium. Nevertheless, this constitutes an advantage.

Pursuant to the present invention, sputtering is the method employed for the deposition of germanium over a substrate comprising a base layer or body. Due to the nature of sputtering deposition, uniformity of the decoration layer can be guaranteed.

The decorative radome for automotive vehicular applications of the present invention comprises a molded radome having a base layer or body composed of a resin and a bright decoration layer on the surface of the base layer or body, the bright decoration layer being composed of a metalloid, such as, germanium and/or a germanium alloy.

By using the layer of germanium and/or germanium alloy, radio transmittance can be improved by several orders of magnitude as compared with an indium layer or other metals such as, tin, as proposed in EP 1560288 A2.

The high conductivity of metals like indium or tin, combined with the variability of thickness of the deposition methods typically used, required each radar window to be tested for radar beam transmissivity during the final stage of production. This increased dramatically the manufacturing cost of the radome.

The very low conductivity of a germanium decoration layer of the present invention, due to the metalloid nature of germanium, combined with the sputtering deposition method, allows one to avoid the requirement for testing of each radome.

Due to the fact of using a metalloid, it not necessary to create areas where no metallic decoration is applied, since the metalloid performs like a dielectric with respect to radar waves. This reduces process complexity in the manufacturing of the radome of the present invention, as compared with the method exemplified in patent JP 2003-252137A.

Figure 1:
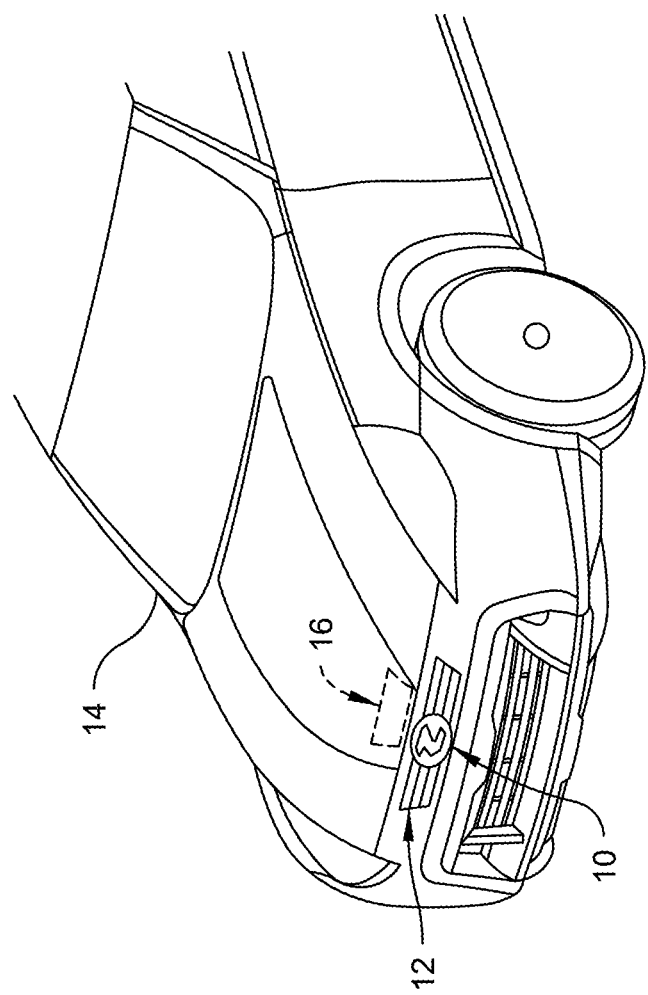
FIG. 1 is a fragmentary isometric view of a vehicle having a decorative radome constructed in accordance with and embodying the invention positioned within a grill assembly and a radar antenna positioned behind the radome.

With reference now in detail to the drawings, wherein like numerals will be employed to denote like components throughout, as illustrated in FIG. 1, the reference numeral 10 denotes generally a decorative radome constructed in accordance with and embodying the invention configured for mounting within a grill assembly 12 of a motor vehicle 14.

Positioned within the vehicle 14 behind and in registration with the decorative radome 10 is a radar antenna 16.

Figure 2:
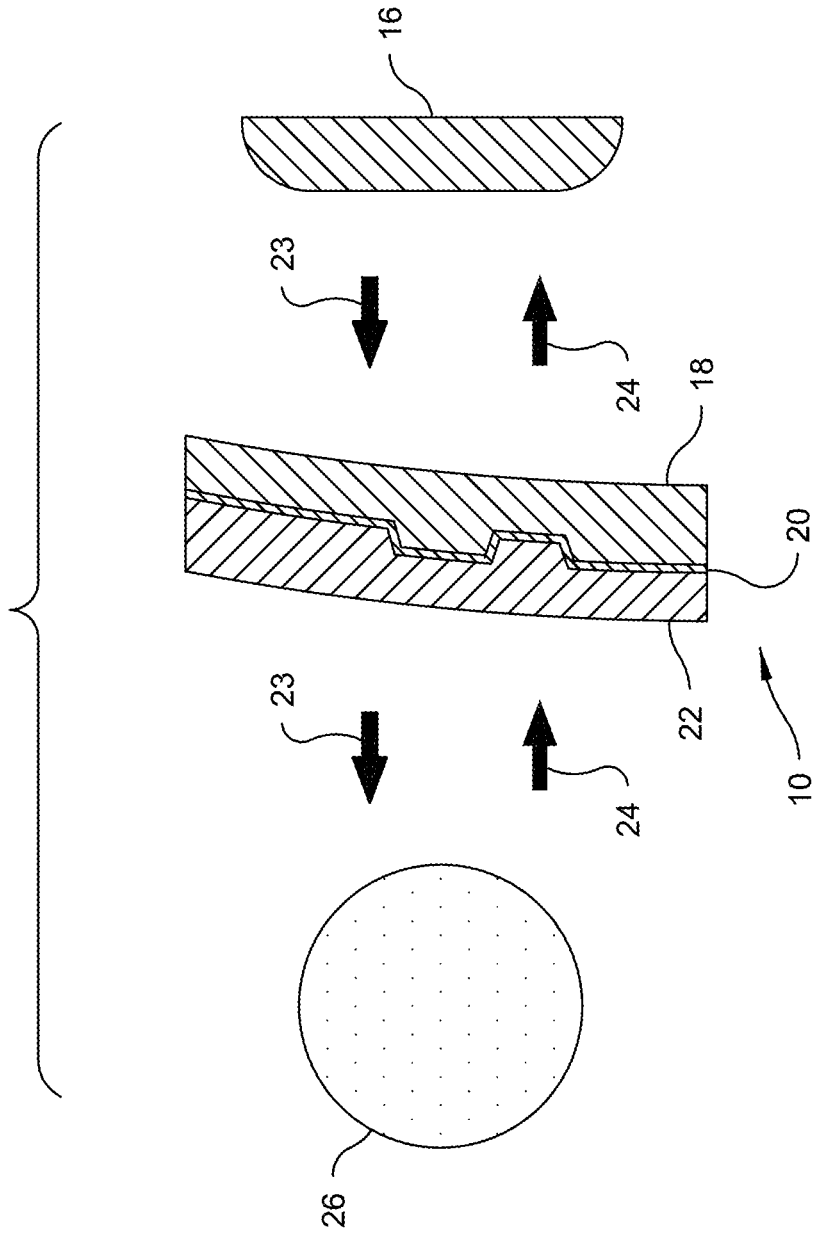
FIG. 2 is a schematized sectional view through a portion of the radome positioned within the grill and showing the radar antenna positioned within the vehicle behind the radome and with a detected object in front of the vehicle, with a schematized representation of emitted and reflected radar waves.
Figure 3:
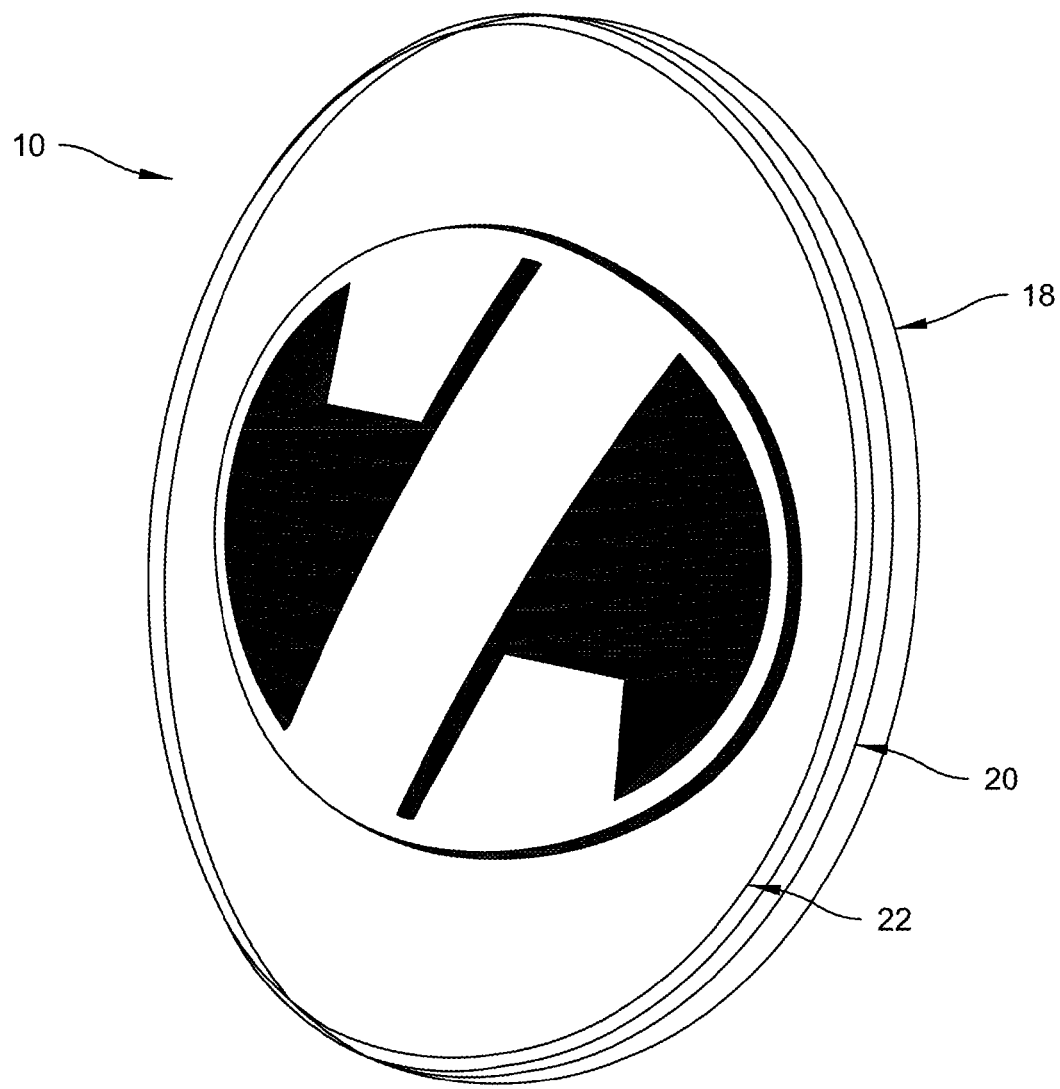
FIG. 3 is an isometric view of the radome showing a base layer, a decoration layer and a protective cover layer.

FIG. 2 comprises a cross section of the radome 10 and illustrating the beam path of a radar antenna according to the present invention. Preferably, a substrate comprising a layer or base body 18 having a proximal face and a distal face is molded of a transparent or nontransparent resin having low radio transmission loss or a resin resulting in low dielectric loss. On the surface of the proximal face, a bright decoration layer 20 comprising germanium and/or a germanium alloy is disposed using sputtering deposition.

Pursuant to the invention, the decoration layer 20 is of uniform thickness. Ornamentation, such as a vehicle emblem, is provided by shaping the proximal face of the base layer or body 18 with projecting and or indented surface configurations.

As is well known to those of skill in the art, sputtering deposition is a physical vapor deposition method wherein atoms or molecules are ejected from a source or target by high energy particle bombardment and are deposited on a substrate, i.e. the base layer or body 18, as a thin film.

The decorative radome 10 according to the present invention can further include a transparent resin layer 22 which overlies the decoration layer 20 for adapting the complete body to the mill metric wave semi wave length resulting in a lower attenuation for the radar waves. The resin layer 22 may be molded over the base body 18 and decoration layer 20 and may include, on its outer face, a decorative ink overlay complementing the ornamental appearance of the decoration layer 20.

The base layer or body 18 is composed of a material that provides low radio transmission loss and is superior in terms of dielectric properties. Relative permittivity E' and dielectric loss tan 0, for example, provide an indication of the dielectric property.

As previously mentioned, the radar antenna 16 is mounted in an automobile 14 and disposed behind the front grill assembly 12. The decorative radome 10, which includes a bright metallic emblem of an automobile manufacturer or a specific decoration, is disposed within the front grill assembly 12.

With reference to FIG. 2, it will be observed that millimeter waves 23 from the radar device 16 are radiated forward through the radome 10 and reflection waves 24 from an object 26 return to the radar device 16 through the radome 10.

The decoration layer 20 may comprise germanium and/or a germanium alloy with the germanium alloy comprising germanium alloyed with one or more elements selected from the metalloids group in the periodic table, such as silicon.

The decorative layer 20 may be formed of a plurality of germanium and/or germanium alloy strata or alternating strata of germanium and germanium alloy with each strata having a thickness in the order of 1 nm to 500 nm, with a thickness of each strata in the order of 10 μm to 100 nm believed to be the most efficient in achieving the objectives of the present invention and for obtaining metallic color effects.

Further the decorative layer may comprise alternating strata of germanium and/or germanium alloy and strata of another metalloid, such as silicon, also applied by sputtering deposition.

Thus is it will be seen that there is provided an decorative radome for automotive vehicular applications which achieves the various aspects, features and considerations of the present invention and which is well suited to meet the conditions of practical usage.

Since various possible embodiments might be made of the present invention and since various changes might be made in the exemplary embodiment shown herein without departing from the spirit of the invention, is to be understood that all matter herein described or shown in the accompanying drawings is to be interpreted as illustrative and not in a limiting sense.

Having thus described the invention, there is claimed as new and desired to be secured by Letters Patent:

1. In a radome having a substrate formed of a dielectric radio transmissive resin, the substrate having a proximal face and a distal face, and a decoration layer deposited on the proximal face of the substrate, an improvement wherein said decoration layer comprises a metalloid having a melting point above 157° C. or a nonmetal alloy including at least one metalloid having a melting point above 157° C., the improvement further including a dielectric nonconductive radio transmissive resin layer abutting and overlying the decoration layer, the substrate, the decoration layer and the resin layer abutting the decoration layer comprising a complete body, whereby radar beams pass through the improved radome substantially without attenuation.

2. An improved radome as constructed in accordance with claim 1, the improvement further comprising the metalloid being germanium and the alloy being an alloy of germanium and one or more other metalloids.

3. An improved radome as constructed in accordance with claim 1, the improvement further comprising the decoration layer being of uniform thickness and being deposited over the entire face.

4. An improved radome as constructed in accordance with claim 1 wherein the radome is positioned with the proximal face of the substrate directed toward a radar antenna and the distal face directed toward an object.

5. An improved radome as constructed in accordance with claim 1, the improvement further comprising the decoration layer being formed of a plurality of metalloid or alloy layers.

6. An improved radome as constructed in accordance with claim 5, the improvement further comprising each metalloid or alloy layer having a thickness in the order of 1 nm to 500 nm.

7. An improved radome as constructed in accordance with claim 5, the improvement further comprising the thickness of each metalloid or alloy layer being in the order of 10 nm to 100 nm.

8. An improved radome as constructed in accordance with claim 1 the improvement further comprising the melting point of the metalloid being at least 938.25° C. and the alloy including at least one metalloid having a melting point of at least 938.25° C.

9. An improved radome as constructed in accordance with claim 1 wherein the dielectric radio transmissive resin layer abutting and overlying the decoration layer abuts and overlies the entire decoration layer.

10. An improved radome as constructed in accordance with claim 9 wherein the resin layer is molded over the decoration layer.

11. An improved radome as constructed in accordance with claim 9 wherein the resin layer includes a decoration ink overlay.

12. An improved radome as constructed in accordance with claim 1 further including a vehicle having a front grill assembly, the improved radome being positioned within the grill assembly, the vehicle further including a radar antenna positioned behind and in registration with the improved radome.

13. An improved radome as constructed in accordance with claim 1, the improvement further comprising the proximal face of the substrate being configured with a design comprising surface indentations or projections.

14. A method of fabricating the improved radome of claim 1, the method including the step of depositing the metalloid or alloy on the proximal face by sputtering deposition.

15. In a method of decorating a radome to be positioned between a radar antenna and an object, the method including the steps of providing a substrate comprising a dielectric radio transmissive resin layer having a proximal face and a distal face and depositing a decoration layer on the proximal face, an improvement wherein the step of:
   a) depositing a decoration layer includes depositing a metalloid having a melting point above 157° C. or a nonmetal alloy including at least one metalloid having a melting point above 157° C. on the proximal face utilizing sputtering deposition;
   the method further including the step of
   b) placing a further dielectric radio transmissive layer in abutting contact with the metalloid or alloy,
   the substrate, the decoration layer and the further dielectric radio transmissive layer having a combined body thickness adapted to a radar beam mill metric wave semi wave length, whereby radar beams pass through the radome substantially without attenuation.

16. An improved method of decorating a radome in accordance with claim 15 further including the step of forming the substrate resin layer by molding prior to performing step of depositing.

17. An improved method of decorating a radome in accordance with claim 15 further including the step of configuring the proximal face with surface indentations or projections prior to performing step of depositing.

18. An improved method of decorating a radome in accordance with claim 15 wherein the metalloid or metalloid alloy comprises germanium or a germanium alloy.

19. In a radome configured to be positioned between a radar antenna and an object, the radome having a base body composed of a dielectric radio transmissive resin and a decoration layer disposed on a surface of the base body, an improvement wherein the decoration layer is of substantially uniform thickness and comprises germanium or a nonmetal alloy of germanium and at least one other metalloid, the improvement further comprising a nonconductive radio transmissive resin layer abutting the decoration layer.

20. An improved radome as constructed in accordance with claim 19, the improvement further comprising the decoration layer being formed of a plurality of germanium or germanium nonmetal alloy layers.

21. A method of protecting and concealing a radar antenna positioned behind a grill assembly of a motor vehicle, the method comprising the steps of:
   a) providing a radome improved in accordance with the method of claim 15; and
   b) positioning the improved radome within the grill assembly and in registration with the radar antenna.

22. A method of protecting and concealing a radar antenna positioned behind a grill assembly of a motor vehicle, the method comprising the steps of:
   a) providing a radome improved in accordance with claim 1; and
   b) positioning the improved radome within the grill assembly and in registration with the radar antenna.

* * * * *